3,669,624
**PROCESS FOR PRODUCING HIGH AVERAGE
PORE VOLUME SILICA**
John L. Warthen, Baltimore, and Thomas H. Cheavens,
Glenwood, Md., assignors to W. R. Grace & Co., New
York, N.Y.
No Drawing. Filed July 9, 1970, Ser. No. 53,645
Int. Cl. C01b 33/00
U.S. Cl. 23—182 R                    10 Claims

ABSTRACT OF THE DISCLOSURE

The present process produces a high pore volume silica of about 2 to 2.65 cc./g. where substantially all of the pore diameter is narrowly distributed between about 100 A. to 500 A. pore diameter. By the present process, silica is slurried in a weak hydrofluoric acid solution followed by filtration. The wet silica is washed thoroughly with alcohol to remove all water and acid, and dried. The silica then is given a mild thermal treatment. The end product silica has about a 50 percent greater pore volume than an unprocessed silica.

BACKGROUND OF THE INVENTION

This invention relates to a method for producing high pore volume silica. This invention further relates to a method for increasing the pore volume of a low pore volume silica. In a specific mode, the silica produced by the present inventive process is characterized in that it has a narrowly distributed pore diameter of from about 100 A. to 500 A. and a pore volume of about 2 to 2.65 cc./g.

Finely divided silica having varying pore volumes and pore diameters are known. Various uses for such silica and also those of the present invention are known and include use as inorganic fillers, carriers, extenders, pigments, adsorbents, catalysts and so on. However, it does not appear to have been known in the prior art to produce such silica materials by any process related to that of the present invention.

Prior art processes for producing silica having defined pore volume characteristics include U.S. Pats. 2,698,305, 2,699,376 and 3,437,441. The process of Pat. 2,698,305 comprises hydrothermally treating a hydrous oxide such as of silica with water in a liquid or vapor phase at elevated temperatures and pressures. The prescribed temperatures are 400° F. to 900° F., and the prescribed pressures 100–3000 pounds per square inch. U.S. Pat. 2,699,- 376 describes a process for increasing the average pore size of a calcined silica gel by contacting a silica with ammonium hydroxide, thereby increasing pore diameter, but decreasing pore area. And U.S. Pat. 3,437,441 sets out a process which comprises producing high porous silica materials by producing a silica in a violent frothing reaction followed by digestion with an acid, preferably sulfuric. The silica is then washed, dried and calcined. These patents set out the current state of the art. The process of the present invention is a definite advance over these processes, and generally over the art. The present process is considerably faster, does not require heating during hydrofluoric acid contact and produces a silica product of up to 40 to 50 percent greater pore volume than the starting material, and one having a narrow range of pore diameter. Further, the silica product from the process of the present invention is in a highly reactive condition. This is accomplished in the present invention by treating the source lower pore volume silica with dilute hydrofluoric acid.

It is an object of this invention to produce high pore volume silica materials.

It is further an object of this invention to set out a process whereby the pore volume of a silica can be increased up to about 40 to 50 percent.

It is additionally an object of this invention to set out a process using hydrofluoric acid whereby the pore volume is rapidly increased.

It is additionally an object of this invention to set out a process whereby the pore volume is increased, but the pore diameter is maintained in the narrow range of from 100 A. and 500 A.

BRIEF SUMMARY OF THE INVENTION

This invention comprises a method for producing high pore volume silica. In one embodiment of the process of the present invention, a source silica of lower pore volume is slurried with a dilute hydrofluoric acid solution, this slurry is filtered to separate the silica, and this filtered silica washed, preferably at least once with an alcohol, to essentially remove traces of acid and water. In a second and preferred embodiment, at a set time after the slurrying of the source silica with hydrofluoric acid, ammonium hydroxide is added to essentially stop the leach reaction of the hydrofluoric acid with the silica. The silica is then washed, and at least once with an alcohol, to remove traces of acid and water. The washed and dewatered silica is then in a preferred embodiment, thermally treated. This product silica has an increased pore volume of up to about 40 to 50 percent and a pore diameter within a narrow range of from about 100 A. to 500 A.

DETAILED DESCRIPTION OF THE INVENTION

Broadly, the present invention comprises producing a high average pore volume silica by contacting a source silica with dilute hydrofluoric acid. The pore volume of the source silica is increased to a degree dependent on the duration of contact with dilute hydrofluoric acid, the temperature utilized during contact, the concentration of the hydrofluoric acid solution, and the concentration ratio of acid solution to silica.

The silica materials useful in the present invention comprise the class known as amorphous silica. Amorphous silica is a synthetic silica produced by many known methods from a silicate solution, usually a sodium silicate solution. This solution is acidified, producing a hydrosol which on aging is converted to a hydrogel. This hydrogel is comminuted if necessary, washed and dried. The drying step is also in many instances an activating step. Drying is usually achieved by rapid spray drying. The silica produced by such a process as outlined is an amorphous porous silica. The porosity, that is the pore volume and pore diameter, is set during the drying step. The pore volume usually may range from about .7 to about 1.7 cc./g., and the pore diameter from about 10 A. to about 1000 A. The silica may be in a powder or granular form, that ranges anywhere from 10 to 4000 microns.

The process of the present invention in a preferred embodiment comprises a process whereby the pore volume of an amorphous silica may be effectively increased. It has unexpectedly been found that the pore volume of a silica having an average pore diameter of less than about 500 A. and particularly in the range of 125 A. to 250 A., is selectively leached by a dilute hydrofluoric acid solution to an increased pore volume without a significant change in average pore diameter. The pore volume is increased about 25 percent to about 60 percent while the average pore diameter remains essentially constant. This selective effect of dilute hydrofluoric acid in the present process was unexpected. Uniquely, pore diameters of above about 300 A., and particularly pore diameters of above 500 A. are not subject to the unexpected effect of this process. Further, another unexpected feature of this process is that the dilute hydrofluoric acid, with the possible exception of fines in the source silica, appears to selectively leach within the pores of the silica and not appreciably attack the silica particle outer surface, This is evident in that the average particle size of the product silica is essentially the same as the average particle size of the source silica. Also, this is evident from experiments, wherein when the silica contains essentially no fines, the source silica and product silica from the process were found to have about the same average particle size.

In a specific mode, the present invention comprises contacting an amorphous silica having a pore volume of about 1.4–1.7 cc./g. and a pore size distribution of principally from about 100 A. to 500 A., with about a 0.05 to about 1 percent solution of hydrofluoric acid for from about 1 minute to about 4 hours. The temperature of contacting may be from about 0° C. to 100° C., with room temperature preferred for obvious reasons of efficiency and control. Further, in the specific mode of the present invention, the concentration of dilute hydrofluoric acid solution to source silica is about 100 to 500 times by weight. Therefore, there must be about 100–500 g. of dilute hydrofluoric acid solution for each gram of silica.

More explicitly, in a preferred embodiment of this invention, the concentration of the dilute hydrofluoric acid contacting solution is from about 0.15 to 0.70 percent by weight hydrofluoric acid, and specifically about 0.40 percent by weight, with a contact time of from 15 to 90 minutes, and specifically about 40 minutes. The preferred ratio of leaching solution to silica is about 150 to 1. Using these preferred and specific parameters, from a source silica having an average particle size of about 68 microns, a pore volume of about 1.7 cc./g. and a pore diameter range of from about 100 A. to 500 A., a silica having an average particle size of about 60 microns, and a pore volume of about 2.33 cc./g. is produced. The pore diameter remains in the range of 100 A. to 500 A.

In a preferred embodiment of the process prior to removing the hydrofluoric acid solution and washing, an ammonium hydroxide solution is added to quench the hydrofluoric acid leach reaction. The concentration of the ammonium hydroxide solution is not critical, but a concentrated solution is preferred so as to maintain solution amounts at as low as a level as possible. The ammonium hydroxide is added to raise the pH to the range of about 5 to 6. At a pH greater than about 6, there is an effect of decreased pore volume (1.8–1.9 cc./g.) which it is theorized is caused by a precipitation of silica within the pores. At pH's below about 4, the leach reaction is not suitably quenched. In this quenched condition, the subsequent washing step can be delayed without any change occurring in the silica product properties, since hydrofluoric acid leaching has been essentially stopped. The quenched silica is then washed one or more times with water to remove any traces of ammonium or fluoride ion, and then dewatered using a dry organic solvent wash. Any dry water miscible organic solvent may be used for dewatering with alcohols and ketones being preferred. Suitable solvents are methanol, ethanol, propanols and acetones.

It is evident from this description that the process parameters of hydrofluoric acid concentration, contact time and acid solution to silica concentration can be altered within the above stated ranges, with or without heating, to produce similar results. These process parameters are interrelated in that if the hydrofluoric acid concentration is decreased, a longer contact time, heating or a change in the acid solution to silica concentration can be made so that a similar product can be produced. It is within the skill of those in reaction kinetics to modify the parameters within the disclosed ranges and achieve essentially the same results once having been made aware of the novel and unexpected features of the present invention. Further substances other than ammonium hydroxide may be used as the reaction quench agent. These may be amines or any other substance which will react and effectively remove hydrofluoric acid from solution, and which can subsequently be washed from the silica.

The following examples are set out to further amplify the present invention and to experimentally illustrate the effect of variation of the various interrelated parameters.

EXAMPLE I 100 g. of an amorphous silica powder of an average particle size of 68 microns and having a nitrogen pore volume of 1.724 cc./g. (125–270 A.=1.159 cc./g. and 240–590 A. =.565 cc./g. and pore diameter range of from 100 A.–500 A. is treated with water to an incipient wetness taking 1.75 cc. $H_2O$/g. $SiO_2$ at about 10 percent TV (Total Volatiles) 10 g. of this material (3.3 g. $SiO_2$) is added to 1 liter of a 0.2 percent aqueous hydrofluoric acid solution at room temperature. This mixture is stirred for 10 minutes, filtered at once and washed on the filter twice, each time with 500 ml. of 2-propanol. This washed and dewatered silica is dried at 370° F. and treated in a muffle furnace for ½–1 hour at 1000° F. The treated silica has an average particle size of 63 microns and a nitrogen pore volume of 2.630. The pore volume increase of pores in the 125–270 A. range is .601 cc./g. The geratest increase in pore volume has been in the pore diameter range of from 125 A. to 270 A. The recovery by weight is about 50 percent.

EXAMPLE II 113.9 g. of amorphous silica powder is slurried at 113° F. with tap water at a concentration of 1.0 g. $SiO_2$ (6.4 percent TV) per 150 cc. of water. Hydrofluoric acid (50 percent) is added to this slurry to give a 0.40 percent hydrofluoric acid-water concentration. This mixture is stirred for 40 minutes and aqueous ammonium hydroxide is added to raise the pH from 1.85 to about 5.0. During the 40 minute period, the temperature is maintained at 113° F. After ammonium hydroxide addition, the mixture is vacuum filtered. The silica filter cake is washed twice on the filter, each time with 2 liters of water. The silica cake is then slurried for 5 minutes with 2 liters of propanol, and this procedure repeated. The silica cake is then dried in vacuum at 300° F., and calcined for 1 hour at 1000° F. The product silica has a nitrogen pore volume of 2.33 cc./g., an increase of approximately .63 cc./g. Recovery is 65 percent.

EXAMPLE III 39.2 g. of amorphous silica powder (1.7 cc./g.), is slurried at 113° F. with tap water at a concentration of 1.0 g. $SiO_2$ (6.4 percent TV) per 306 cc. of water. Hydrofluoric acid (50 percent) is added to this slurry to give a 0.24 percent hydrofluoric acid-water concentration. This mixture is slurried for 50 minutes and 115 cc. of aqueous ammonium hydroxide is added to raise the pH from 1.85 to about 5.5–6. During the 50 minute period, the temperature is maintained at 113° F. After ammonium hydroxide addition, the mixture is allowed to stand for 2 minutes and is vacuum filtered. The silica filter cake is washed twice on the filter, each time with 2 liters of water. The silica cake is then dewatered by being slurried for 5 minutes with 2 liters of propanol, and this procedure repeated. The silica cake is then dried in vacuum at 300° F., and calcined for 1 hour at 1000° F. The product silica has a nitrogen pore volume of 2.44 cc./g., an increase of approximately .74 cc./g. Recovery is 65 percent. The average particle size and pore diameter range remains essentially the same.

EXAMPLE IV 39.2 g. of amorphous silica powder (1.7 cc./g.) is slurried at 113° F. with tap water at a concentration of 1.0 g. $SiO_2$ (6.4 percent TV) per 306 cc. of water. Hydrofluoric acid (50 percent) is added to this slurry to give a 0.24 percent hydrofluoric acid-water concentration. This mixture is stirred for 50 minutes and 115 cc. of aqueous ammonium hydroxide is added to raise the pH from 1.85 to about 5.5. During the 50 minute period, the temperature is maintained at 113° F. After ammonium hydroxide addition, the mixture is allowed to stand for 10 minutes and is vacuum filtered. The silica filter cake is washed twice on the filter, each time with 2 liters of water. The silica cake is then dried in vacuum at 300° F., and calcined for 1 hour at 1000° F. The product silica has a nitrogen pore volume of 2.28 cc./g., an increase of approximately .58 cc./g. Recovery is 63.8 percent. The average particle size and pore diameter range remains essentially the same.

EXAMPLE V 113.2 g. of amorphous 8–14 mesh silica (1.7 cc./g.) is mixed at 113° F. with tap water at a concentration of 1.0 g. of $SiO_2$ per 150 cc. of water. Hydrofluoric acid (50 percent) is added to this slurry to give a 0.40 percent hydrofluoric acid-water concentration. This mixture is stirred for 75–80 minutes while being maintained at 113° F. 115 cc. of ammonium hydroxide is added to raise the pH up to 5.5. After ammonium hydroxide addition, the mixture is allowed to stand for 5 minutes (to simulate possible plant conditions) and is then charged into a centrifuge for washing. Water is sprayed onto the centrifuging silica, followed by a dewatering using a propanol spray. The dewatered silica is removed from the centrifuge, vacuum dried at 300° F., and crushed to an average particle size of about 100 microns. This silica is then calcined for 1 hour at 1000° F. The product has a average pore volume of 2.31 cc./g. and essentially a pore diameter range of 100 A. to 300 A. Recovery is 68 percent.

What is claimed is:

1. The process of increasing the pore volume of an amorphous silica while maintaining the pore diameter, comprising:
   (a) contacting an amorphous silica having a pore volume of less than 2.0 cc./g. with a .05 percent to 1 percent hydrofluoric acid solution for from 2 minutes to 4 hours, the ratio of said hydrofluoric acid solution to said amorphous silica being from about 500 to 1 to about 100 to 1 in parts by weight;
   (b) adding ammonium hydroxide to raise the pH to about 5 to 6;
   (c) filtering the silica from the solution mixture;
   (d) washing the filtered silica at least once with water and dewatering using an alcohol; and
   (e) drying the washed silica and recovering a silica having a pore volume greater than 2.0 cc./g.

2. The process of claim 1 wherein said contacting is essentially by slurrying the silica with dilute hydrofluoric acid solution at a temperature of from about 0° C. to 100° C.

3. The process of claim 2 wherein the hydrofluoric acid is about a 0.40 percent solution, the hydrofluoric acid solution to silica ratio is about 200 to 1, and the contact time is 25 to 50 minutes.

4. The process of claim 3 wherein after drying at from 250° F. to 400° F., said silica is calcined at about 800° F. to 1100° F.

5. The process of increasing the pore volume of an amorphous silica while maintaining the pore diameter, comprising:
   (a) contacting an amorphous silica having a pore volume of about 1.4 to 1.8 cc./g. with about a 0.15 to 0.70 percent aqueous hydrofluoric acid solution for from 2 minutes to 4 hours wherein said acid solution to silica ratio is about 100 to 1 to about 500 to 1;
   (b) adding ammonium hydroxide to raise the pH to about 5 to 6,
   (c) filtering the silica from the mixture, and
   (d) washing the filtered silica at least once with water, dewatering using an alcohol, and drying the increased pore volume product silica.

6. The process of claim 5 wherein the time of contacting is 40 minutes.

7. The process of claim 5 wherein alcohol is selected from the group consisting of methanol, ethanol and propanols and acetone.

8. The process of claim 5 wherein said silica is dried at about 250° F. to 400° F. and substantially calcined at about 800° F. to 1100° F.

9. The method of claim 5 wherein said hydrofluoric acid is a 0.40 percent by weight aqueous solution and said acid solution to silica concentration is about 150 to 1 by weight.

10. The process of claim 9 wherein the product silica has pore volume of about 2.0 to 2.65 cc./g.

References Cited

UNITED STATES PATENTS

| | | | |
|---|---|---|---|
| 3,494,875 | 2/1970 | Page et al. | 23—182 X |
| 3,243,262 | 3/1966 | Can et al. | 23—182 |
| 2,731,326 | 1/1956 | Alexander et al. | 23—182 |
| 2,506,923 | 5/1950 | Hoekstra. | |
| 2,794,002 | 5/1957 | Haensel | 23—182 X |
| 3,526,603 | 9/1970 | Acker | 23—182 X |
| 3,442,678 | 5/1969 | Ross | 23—182 X |

HERBERT T. CARTER, Primary Examiner